Sept. 19, 1933.   A. C. BRYAN   1,927,276
DUAL REAR AXLE DRIVE FOR AUTO TRUCKS
Filed Feb. 25, 1931   2 Sheets-Sheet 2
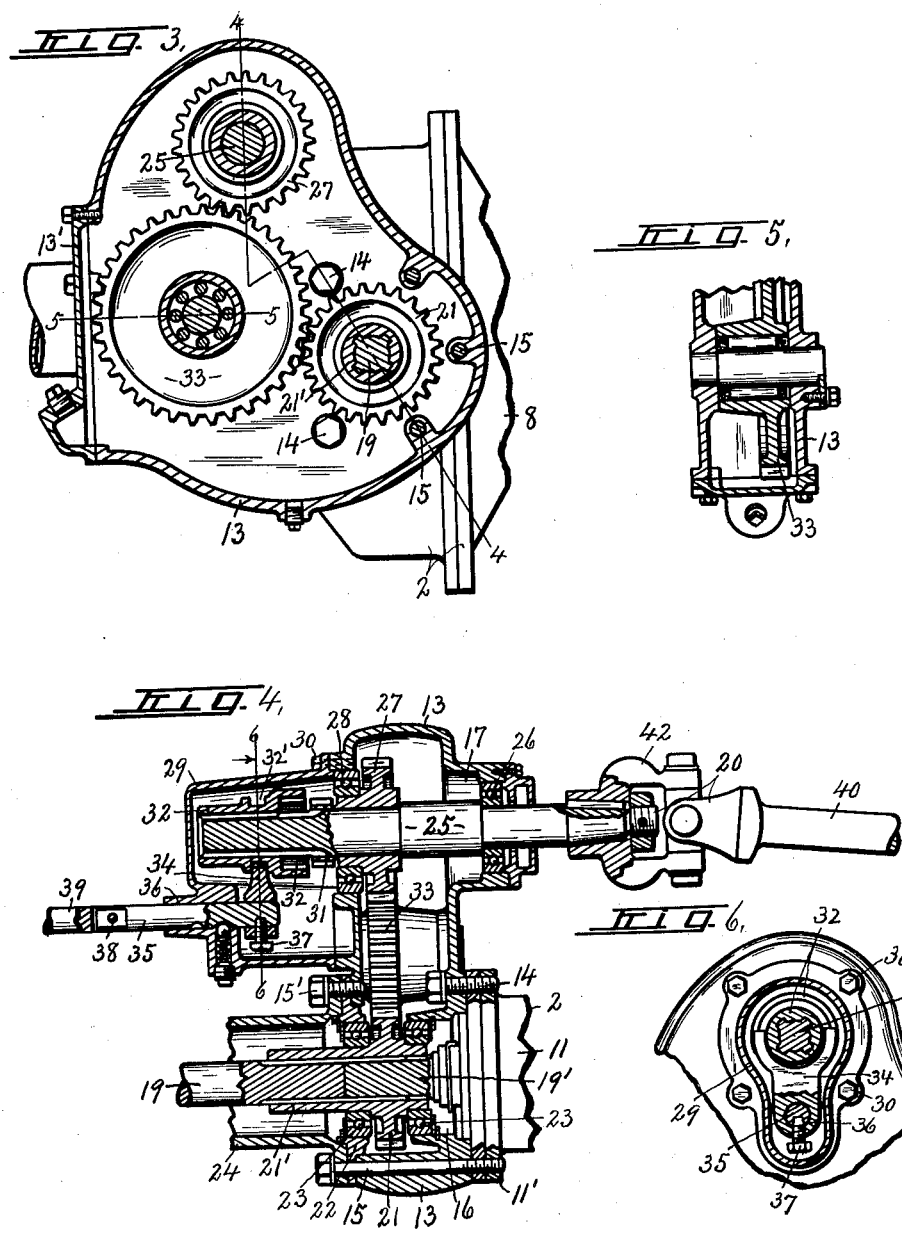
WITNESS
J. J. Mains
INVENTOR
A. C. Bryan
BY
Denison & Thompson
ATTORNEYS Patented Sept. 19, 1933

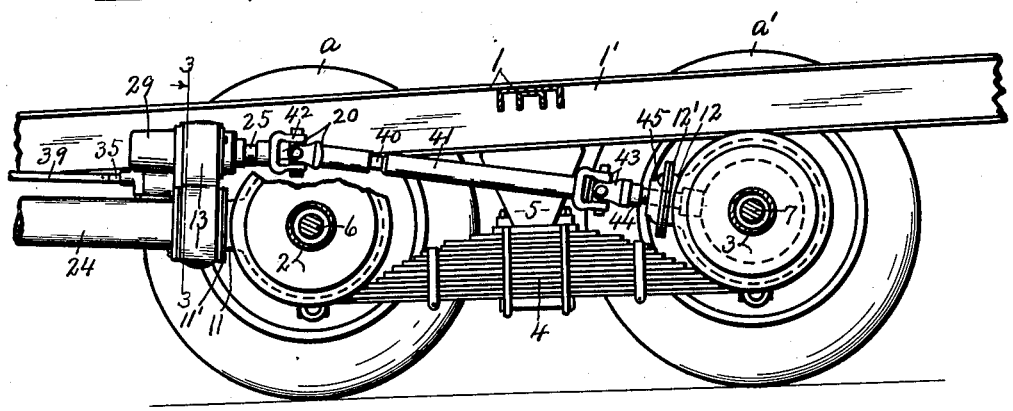

1,927,276

UNITED STATES PATENT OFFICE 1,927,276

DUAL REAR AXLE DRIVE FOR AUTO TRUCKS

Artis Chester Bryan, Syracuse, N. Y.

Application February 25, 1931. Serial No. 518,168

3 Claims. (Cl. 180—22)

This invention relates to motor vehicles and refers more particularly to auto trucks of the dual rear axle type in which each axle includes a pair of co-axial wheel-supporting shaft sections connected through the medium of a differential gearing, and to the means for transmitting motion from motor-driven shaft to both sets of differential gearing.

For convenience of description, each pair of axle sections may be considered as a unitary axle which, together with its differential gearing, is enclosed in a suitable housing for protection against the elements and also to afford bearings and means for lubricating the axle and its bearings.

These axle-housings are arranged in longitudinally spaced parallel relation transversely of the frame of the machine a distance somewhat greater than the diameter of the wheels carried by the axles and serve to receive and support the opposite ends of a pair of leaf-springs which extend lengthwise of the machine equal distances from, and at opposite sides of, the longitudinal center of the frame, and are pivotally connected intermediate their ends to said frame for yieldingly supporting the latter in a plane above the axle housing, the springs serving to hold the axle housings in parallel spaced relation.

Both of the axles, together with the differential gearings, and their housings are preferably similar and interchangeable and may be of standard equipment, one of the differentials, in this instance the front differential, being directly connected to the driving shaft of the motor for driving the corresponding axle and wheels connected thereto for traction purposes.

The main object of the present invention is to provide simple and efficient means including a clutch operable at will for connecting and disconnecting the motor-driven shaft to and from the differential gearing of the rear axle, whereby the latter may be positively driven for traction purposes when required, or allowed to trail freely along and upon the road without the application of driving power thereto.

One of the specific objects is to transmit motion from the motor shaft to the rear differential through the medium of a supplemental shaft and suitable gearing whereby the supplemental shaft may be rotated in the same direction as the drive shaft.

Another specific object is to provide means, operable at will, for connecting and disconnecting one of the last-named gears to and from the supplemental shaft, and thereby to cause a positive drive or free rolling action of the rear axle according to the election of the driver.

Under ordinary loads and road conditions, the positive driving of one of the axles, in this instance the front axle, and its corresponding wheels, is sufficient to propel the machine forwardly or rearwardly, in which case the rear axle and its supporting wheels will be free to roll or trail along the road without the application of power thereto, thereby avoiding the strain and wear upon the free wheels and corresponding axle.

On the other hand, under excessive load or unfavorable road conditions in which the traction of one set of wheels is insufficient to propel the machine, the other or rear set of traction wheels and corresponding axle may be placed in connection with the drive shaft for positively driving the same and thereby increasing the traction to a sufficient extent to propel the machine in either direction.

The broad object, therefore, of the invention is to enable the rear axle to be connected to and disconnected from the drive shaft so that when not required for traction purposes, it may be allowed to roll or trail freely along the road, thereby reducing the cost of operation of the machine due to the reduced strain and wear upon the free wheels and corresponding axle.

A further object is to provide the supplemental shaft with telescoping sections splined one upon the other for simultaneous rotation and relative axial movement so as to allow free vertical and weaving motion of the axles and their respective housings relatively to each other as the machine is travelling over uneven road surfaces or obstructions.

Other objects and uses relating to specific parts of the machine will be brought out in the following description.

In the drawings:—

Figure 1 is a top plan of the rear portion of the chassis of a motor truck showing the dual rear axle housings and axle-supporting wheels, together with the means for driving the front and rear differential gearings.

Figure 2 is a longitudinal vertical sectional view of the same parts taken in the plane of line 2—2, Figure 1.

Figure 3 is an enlarged transverse vertical sectional view taken in the plane of line 3—3, Figure 2, showing more particularly the gearing for transmitting motion from the main drive shaft to the supplemental shaft.

Figure 4 is a longitudinal vertical sectional view taken along the line of 4—4, Figure 3.

Figure 5 is a detail sectional view taken in the plane of line 5—5, Figure 3.

Figure 6 is a detail vertical sectional view taken in the plane of line 6—6, Figure 4.

In order that the invention may be clearly understood I have shown the rear portion of a chassis frame —1— and a pair of similar and interchangeable axle housings —2— and —3— arranged in longitudinally spaced parallel relation a distance apart somewhat greater than the diameter of either of the wheels.

The housings —2— and —3— serve to support at their outer ends a pair of longitudinally extending leaf springs —4—, the central portions of which are pivotally mounted in the usual manner upon suitable brackets —5— on the opposite lengthwise sills —1'— of the chassis frame —1—, as shown more clearly in Figures 1 and 2.

The housings —2— and —3— serve to enclose the usual axle sections as —6— and —7—, and also the usual differential gearings connecting the co-axial sections in each housing, the axle sections and differential gearing being of standard make and of similar construction so that they may be interchanged.

The differential gearings are usually enclosed in enlarged portions —8— and —9— of the housings —2— and —3— which are also similar and interchangeable, the front axle sections being provided at their outer ends with suitable traction wheels —a— while the rear axles' sections are provided at their outer ends with similar traction wheels —a'— which may be of the same diameter as, or of different diameter than, that of the front wheels —a—.

The differential housings —8— and —9— are provided respectively with forwardly projecting tubular extensions —11— and —12—, preferably of similar construction to enable the axle housings to be interchanged if desired, or at least to be made in duplicate, the front end of the extensions —11— and —12— being provided with out-turned flanges —11'— and —12'— for a purpose hereinafter explained.

*Axle driving mechanism*

A gear case —13— is secured by releasable means such as bolts —14— and —15— to the flange —11'— of the extension —11— directly in front of the differential gear case —8—, and is provided with lower and upper lengthwise openings —16— and —17— for receiving the adjacent portions of a motor-actuated driveshaft —19— and a supplemental shaft —20—. See Figure 4.

The main drive shaft —19— is connected to a co-axial shaft section —19'— forming a part of the differential gearing within the housing —8—, the adjacent ends of the shaft sections —19— and —19'— being splined to the hub as —21'— of a co-axial gear —21— so that the hub of the gear forms a coupling connection between the two shaft sections —19— and —19'—.

A bearing section —22— is secured partially by the bolts —15— and by additional bolts —15'— to the front portion of the gear case —13— within the adjacent end of the opening —16—, said gear case, including its section —22—, being provided with suitable anti-friction bearings —23— in which the hub of the gear —21— is journaled for supporting the adjacent ends of the shaft sections —19— and —19'—.

The drive shaft —19— is enclosed within a tubular housing —24— having its rear end flanged outwardly and secured by the bolts —15— and —15'— to the front face of the gear case section —22— to extend forwardly therefrom and has its front end connected in any well known manner to the chassis frame, the front end of the shaft —19— being also connected in any well known manner to the crank shaft of the engine, it being understood that the connections between the front ends of the shaft —19— and its enclosing tube —24— will be provided with universal joints of any conventional make.

The supplemental shaft —20— is provided with a relatively short lengthwise section —25— having its rear end journaled in a suitable bearing —26— in the corresponding end of the gear case —13— to extend rearwardly therefrom, and its intermediate portion provided with a loose gear —27— having its hub journaled in a suitable bearing —28— in the rear side of the housing —13— for additionally supporting the shaft within in the opening —17— of the housing.

A clutch housing —29— is secured by bolts —30—, or equivalent fastening means to the front side of the gear case —13— to extend forwardly therefrom and into which the front end of the supplemental shaft section —25— extends.

The front end of the gear —27— is provided with a relatively fixed clutch section —31— adapted to be engaged by a co-axial sliding clutch section —32— which is splined on the front end of the shaft to rotate therewith.

An idler gear —33— is journaled in suitable bearings within the gear case —13— and meshes with both of the gears —21— and —27— for transmitting rotary motion from the drive shaft —19— to the supplemental shaft section —25—, the gears —21— and —27— being of substantially uniform diameter to rotate the supplemental shaft —20— in the same direction and at the same rate of speed as the drive shaft. See Figure 5.

The hub of the clutch member —32— is provided with an annular groove —32'— for receiving one end of a shifting member —32— which is movable axially of the shaft section —25— within the clutch housing —29—.

A shifting rod —35— is slidable in an opening —36— in the front end of the clutch housing —29— and has its rear end secured by a set screw —37— to the shifting member —34— and its front end pivotally connected at —38— to an extension —39— which is adapted to extend forwardly into the cab to be operated by the driver from the seat of the vehicle in any well known manner not necessary to herein further illustrate or describe.

The supplemental shaft —20— is also provided with telescoping sections —40— and —41— splined one within the other to rotate in unison and also to permit relative axial movement thereof, the front end of the shaft section —40— being connected by universal joint or coupling —42— to the rear end of the shaft section —25—, while the rear end of the shaft section —41— is connected by universal joint or coupling —43— to the pinion shaft —44— of the rear differential gearing within the housing —9—, as shown by dotted lines in Figure 2.

The tubular extension —12— of the rear differential gear case —9— is provided with a cap section —45— in which the adjacent end of the pinion shaft —44— is journaled to hold the pinion shaft radial to the rear axle sections —7—, as shown by dotted lines in Figure 2, and to permit axial removal of the pinion when desired.

The opening in the gear case —13— normally closed by the cap section —22— is of sufficient size to permit the gear —21— to be removed and replaced therethrough.

It will also be noted upon reference to Figure 3 that the gear case is provided with a removable cap section —13'— of sufficient size to permit the passage of the idler gear —33— therethrough.

The upper portion of the gear case —13— containing the gear —27— and shaft section —25— is offset toward the right hand of the machine beyond the vertical plane of the shaft-housing —24— to allow the adjacent portion of the shaft sections —25— and —40— and universal joint —20— to be brought as closely as possible to the upper side of the reduced portion of the housing —2— without friction therewith, and thereby to reduce the angle of inclination of the shaft sections —40— and —41— toward the rear differential gear case —9—, said shaft sections —40— and —41— being also inclined laterally at a slight angle with reference to the shaft sections —25— and —44—, as shown in Figure 1.

It is evident, however, that the universal couplings —42— and —43— permit free rotation of the shaft section —40— and —41— without undue lost motion for transmitting rotary motion from the shaft section —25— to the differential gearing in the rear housing —9—.

The splined connection between the shaft sections —40— and —41—, together with the universal couplings —42— and —43—, permit free vertical movement of either of the axle housings —2— and —3— relatively to the frame —1—, and also to permit weaving motion of the axle housings relatively to each other and to said frame, as the wheels pass over obstacles or uneven road surfaces, without liability of overstraining any parts of the truck, it being understood that the springs —4— not only establish resilient connections between the axle housings —2— and —3— and frame —1—, but also serve to hold the wheels in tractional engagement with the road surface.

*Operation*

The main drive shaft —19— always remains in constant driving connection with the differential gearing within the housing —8— for driving the axle sections —6— and corresponding wheels —a—.

Under ordinary load and road conditions the driving of the traction wheels —a— is sufficient to propel the vehicle forwardly and rearwardly, in which case the clutch member —32— will be withdrawn out of engagement with its companion clutch member —31— on the supplemental shaft section —25— through the medium of the shifting rods —35— and —39— which, as previously stated, are actuated by the operator from the seat of the vehicle.

When the clutch member —32— is disengaged from its companion clutch member —31— and the drive shaft —19— continues its rotation, rotary motion will be transmitted to the loose gear —27— on the supplemental shaft section —25— through the medium of the idler gear —33—, but will have no driving effect upon the supplemental shaft.

It is evident, however, that under these conditions the rear axle sections —7— and corresponding wheels —a'— will simply idle with the wheels rotating in contact with the road surface, thereby reducing the strain and wear upon the rear wheels and corresponding axle sections to a minimum.

This free rolling action of the rear wheels —a'— is transmitted through the corresponding axle sections and differential gearing within the housing —9— to the supplemental shaft —20— which, together with the clutch section —32— will be free to rotate independently of the loose gear —27— and its driving gears —33— and —21—.

On the other hand, if the load is excessive or the road conditions are unfavorable to a proper traction between the front wheels —a— and road surface for propelling the vehicle forwardly or rearwardly, the driver may easily and quickly operate the shifting rods —29— and —35—, together with the shifting member —34—, to force the clutch member —32— into engagement with its companion clutch —31— on the hub of the gear —27—, thereby locking said gear to the shaft section —25— so that rotary motion may then be transmitted to the supplemental shaft —20— through the medium of the gears —21—, —33— and —27— for positively driving the rear axle sections —7— and corresponding wheels —a'— with the assurance that sufficient traction will then be developed to propel the machine in either direction.

The advantage of the clutch operably connected to the rear axle in a manner described is that the rear axle sections may be easily and quickly connected to, or disconnected from, the driving shaft as may be required for normal or extra traction purposes, but under normal conditions the positive driving of the two front wheels affords sufficient traction so that the clutch may be disconnected to enable the rear wheels to roll freely independently of the driving shaft, thereby reducing the strains and wear upon the rear tires to enable them to be used for a much longer period of time than would be possible if the positive drive connections were continually maintained between the drive shaft and rear axles.

The gear case —13— is adapted to receive and retain a sufficient quantity of oil or other lubricant for lubricating the several gears and clutch therein and the bearings for the adjacent shaft sections and, of course, the gear case will also be provided with the usual filler opening and drainage opening normally closed by suitable plugs, as shown in Figure 3.

The construction and operation of the driving connections between the engine shaft and both of the rear axles, as shown and described, are particularly simple, durable and highly efficient, but obviously various changes may be made in the detail construction without departing from the spirit of the invention.

What I claim is:—

1. In a dual-rear-axle drive mechanism for motor vehicles, a motor-actuated drive-shaft in constant driving connection with one of the axles, a supplemental shaft in constant driving connection with the other axle, a loose gear on the supplemental shaft, gear transmission from the drive-shaft to said loose gear, and a clutch member splined on the supplemental shaft to rotate therewith and movable into and out of clutch engagement with the loose gear for making and breaking the driving connection between the drive-shaft and supplemental shaft.

2. In a dual-rear-axle drive mechanism for motor vehicles, a drive-shaft, means for transmitting motion from the drive-shaft to the front axle, a second shaft, a loose-gear on the second shaft having gear connection with the drive shaft for receiving motion therefrom, releasable means operable at will for locking the loose-gear to the second shaft to cause the rotation of the latter, and means for transmitting motion from the second shaft to the rear axle.

3. In a dual-rear-axle drive mechanism for motor vehicles, housings for the axles, a gear-case secured to the front housing, a drive shaft journaled in the gear-case and operatively connected to the front axle for driving the same, a second shaft journaled in the gear-case and operatively connected to the rear axle for driving the latter, a gear loosely mounted on the second shaft within the gear-case and geared to the drive-shaft to receive motion therefrom, and means operable at will for locking and releasing the loose gear to and from the second shaft.

ARTIS CHESTER BRYAN.